United States Patent [19]
Wilfert et al.

[11] 3,891,266
[45] June 24, 1975

[54] ROOF FOR MOTOR VEHICLES

[75] Inventors: Karl Wilfert, Gerlingen-Waldstadt; Béla Barényi, Maichingen; Hermann Renner, Magstadt, all of Germany

[73] Assignee: Daimler-Benz Aktiengesellschaft, Germany

[22] Filed: Nov. 24, 1972

[21] Appl. No.: 309,357

[30] Foreign Application Priority Data
Nov. 26, 1971  Germany................................ 2158707
Nov. 27, 1971  Germany................................ 2158962

[52] U.S. Cl............................................. 296/137 R
[51] Int. Cl............................................. B60q 3/00
[58] Field of Search............... 296/137 R, 28 R, 102

[56] References Cited
UNITED STATES PATENTS
2,947,567   8/1960   Barenyi........................ 296/28 R
3,019,049   1/1962   Barenyi........................ 296/137 R
3,080,189   3/1963   Barenyi........................ 296/28 R
3,625,562   12/1971  Barenyi........................ 296/28 R
3,728,537   4/1973   Barenyi........................ 296/137 R

*Primary Examiner*—Robert R. Song
*Attorney, Agent, or Firm*—Craig & Antonelli

[57] ABSTRACT

A roof for motor vehicles, especially for passenger motor vehicles which includes a lower roof plate, a roof frame adjoining the same and consisting of longitudinal and cross girders and an upper cover plate covering the roof frame; the roof frame is thereby disposed outside of the vehicle interior space delimited by the inner roof plate; the cross girders may be arranged at a horizontal distance with respect to the upper edges of the front and/or rear windowpane and leave open a space for the accommodation of signalling lights and/or headlights.

66 Claims, 14 Drawing Figures

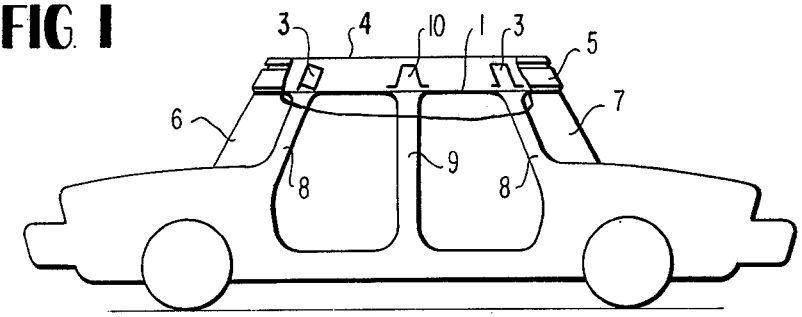
FIG. 1
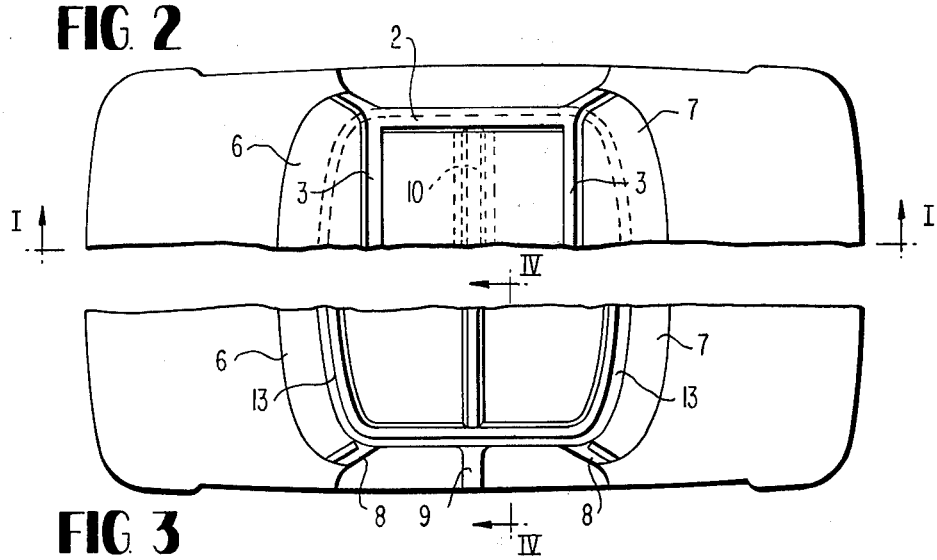
FIG. 2
FIG. 3
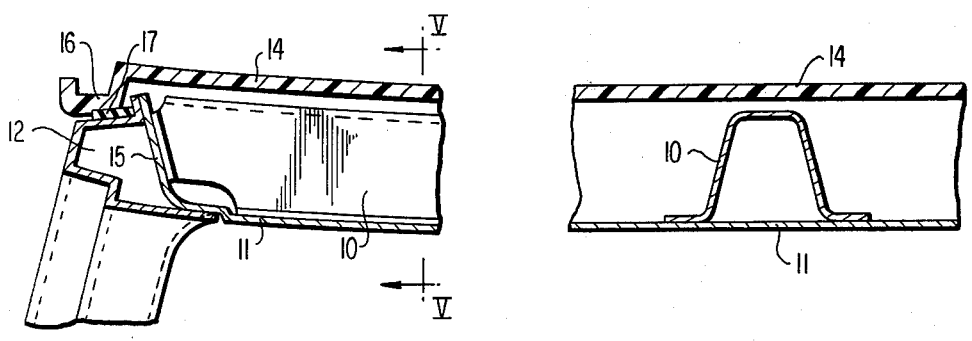
FIG. 4          FIG. 5

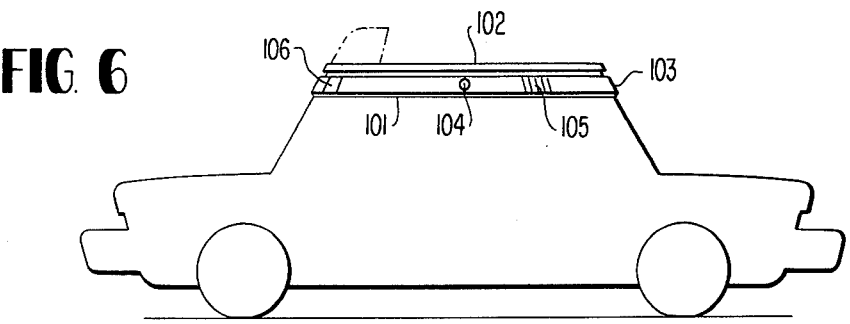
FIG. 6
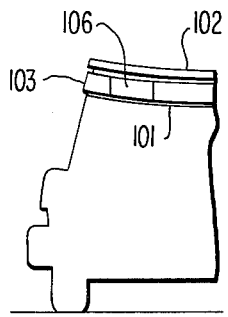
FIG. 7a
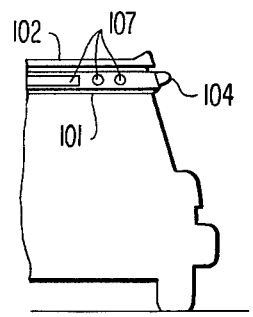
FIG. 7b
FIG. 8a
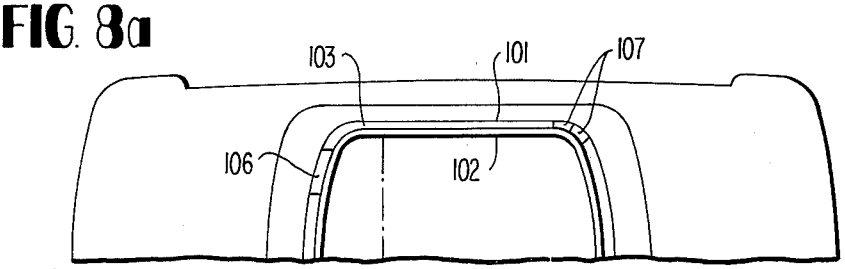
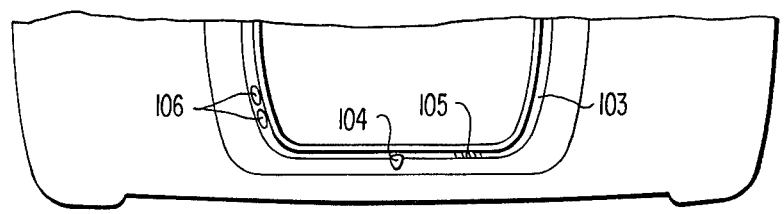
FIG. 8b

ROOF FOR MOTOR VEHICLES

The present invention relates to a roof for motor vehicles, especially for passenger motor vehicles which includes a roof sheet metal panel or plate and a roof frame adjoining the same and consisting of longitudinal and cross bearers. Additionally, the present invention relates to a roof for motor vehicles which accommodates signalling lights and/or headlights.

It is generally customary in the motor vehicle construction that the sheet metal roof panel or plate covers the inwardly disposed cross and longitudinal bearers forming the roof frame so that on the outside a smooth roof surface is present. These known roof constructions do not satisfy the modern safety requirements made thereof. In order to protect the vehicle passengers against accident consequences, it is necessary that the vehicle cell receives a high form-or shape-rigidity also within the area of its roof. This can be realized with the prior art types of constructions only in that the existing roof bearers or roof girders are constructed larger. However, in addition to a loss in head freedom, this is also additionally opposed by the fact that the internal safety of the motor vehicle is reduced thereby in that dangerous projecting edges or the like are created, against which the vehicle passengers may hit in case of an accident.

The present invention is concerned with the task to provide a roof of the aforementioned type with structurally slight expenditures which excels by a high form-rigidity without impairing the internal safety. The present invention essentially consists in that the roof frame is arranged outside of the vehicle interior space delimited by the roof sheet metal panel or plate member and is covered on the outside by means of a cover plate. It is achieved thereby that the design and configuration of the roof frame can be dimensioned exclusively for a high form-rigidity since the roof frame is without influence on the internal safety because the vehicle interior space is delimited by the smooth roof panel or plate member. Additionally, an optically appealing roof is obtained thereby because it is closed off on the outside by a cover plate. In addition thereto, the advantage results which is predicated on the fact that the longitudinal and cross bearers project beyond the roof inner surface because in that case an obstacle then impinges directly on the longitudinal and cross bearers in case of a rolling-over without causing an immediate deformation of the roof panel or plate.

In a structurally advantageous embodiment of the present invention, profiled parts serve as longitudinal and cross bearers which form hollow bearers together with the roof sheet metal panel or plate member. Such hollow bearers produce a high rigidity without necessitating a considerable increase in weight.

Provision is made in one advantageous embodiment of the present invention that the roof sheet metal panel or plate is constructed as a dish or shell open in the upward direction, whose bent-up edge serves as wall of the outwardly disposed longitudinal and cross bearers constructed as hollow bearers. An additional space is created by this construction in conjunction with the cover plate which may be utilized as loading or storage space.

According to a further feature of the present invention, provision is made that the cross bearers are disposed in one plane together with the columns of the support frame of the vehicle at a distance with respect to the forward or rear edge of the roof sheet metal panel or plate member, which columns support the roof frame. This type of construction increases the formrigidity of the roof above all within the area of the heads of the vehicle passengers whereas additionally the advantage is achieved that a high degree of freedom exists in the design of the front and rear window.

It is also advantageous if the space enclosed by the roof sheet metal panel or plate or by the longitudinal and cross bearers and the cover plate is sealed off against the outside. In order to obtain a good accessibility to this additional storage space, it is favorable if the cover plate is detachably or movably secured at the roof sheet metal panel or at the longitudinal and cross bearers.

It is structurally advantageous if the cover plate consists of synthetic plastic material of any known type such as of synthetic resinous material. Additionally, a particularly aesthetic impression can be achieved by such a cover plate especially since this cover plate can have a configuration in its surface which can be far-reachingly freely selected.

It is also customary in passenger motor vehicles to arrange the headlights and signalling lights at the front and rear end of the vehicle within the area of the protective panels. Especially by reason of the safety regulations which prescribe that in case of collisions at low velocities, the headlights or signalling lights must not be damaged, it will be necessary to abandon the traditional light arrangement and to arrange the same at less endangered places. One of the places where the signalling lights and headlights could be arranged is thereby the area of the roof. Such an arrangement is known as such whereby the headlights are arranged outside the outer roof surface. This arrangement of the light leads, on the one hand, to an impairment of the streamlining of the vehicle whereas, on the other, disturbing wind noises occur at these lights, especially in fast vehicles. Additionally, the possibility is thereby greatly impaired to clean such a vehicle, especially in an automatic car wash or the like where the vehicle is carried by a conveyor.

It is also known in the prior art to install the lights completely or partially into the roof frame. This type of construction, however, leads to a weakening of the roof bearers which should be avoided for safety reasons. Additionally, the manufacturing and assembly expenditures are increased.

The present invention is therefore also concerned with the task to provide a roof of the aforementioned type which enables the accommodation of signalling lights and/or headlights without considerable increase of the structural expensitures and without disturbing the streamlining. The present invention therefore also essentially consists in that a double-walled roof is provided which contains between two roof plates or panels longitudinal girders or bearers and cross girders or bearers, of which the latter extend at a horizontal distance relative to the upper edges of the front and/or rear windowpanes and leave free a space for the accommodation of the signalling lights and/or the headlights. This roof construction creates a space in a simple manner, within which the headlights and signalling lights can be accommodated without projecting beyond the contour of the vehicle. The cross girders or bearers of the roof frame are not weakened thereby whereas the lights or headlights are additionally readily accessible. Additionally, it is possible by this construction to reinforce the cross and longitudinal girders or bearers of the roof frame in a manner which satisfies the modern safety requirements without creating thereby projecting edges or the like on the inside of the passenger space since the latter is delimited by the smooth inner surface of the inner roof plate or panel.

It is structurally favorable if the cross girders receive or form on their outsides mounting supports for the signalling lights and/or the headlights and the cover panes thereof.

In one embodiment of the present invention, the covering panes of the signalling lights and/or of the headlights extend between the upper edges of the front and/or rear windowpane and the outer roof plate or panel.

In another embodiment of the present invention, provision is made that the set-back cross girders or bearers are provided with forwardly or rearwardly directed abutment flanges for the upper edges of the front and rear windowpanes.

It is advantageous if the space occupied by the signalling lights and/or headlights constructed preferably as structural units, is covered off at least partially by the upper removably mounted roof plate. It becomes possible thereby to expose this space during the assembly in a simple manner. For achieving particular optical effects, it may be of advantage if the outer roof plate or panel again consists of synthetic plastic material.

In order to further utilize the roof, provision is made in an advantageous embodiment of the present invention that one or several sealing elements are arranged between the roof plate and the parts disposed therebelow. As a result thereof, a dust and water-tight space is created thereby which can be utilized additionally as loading or storage space.

Accordingly, it is an object of the present invention to provide a roof for motor vehicles which avoids by simple means the forementioned shortcomings and drawbacks encountered in the prior art.

Another object of the present invention resides in a roof for motor vehicles, especially for passenger motor vehicles which fully satisfies all safety requirements of modern vehicle design.

A further object of the present invention resides in a roof for motor vehicles, especially passenger motor vehicles which permits the attainment of a high form-rigidity combined with a high degree of internal safety.

Still a further object of the present invention resides in a roof of the type described above which not only permits an aesthetically pleasing appearance but additionally creates an auxiliary space that can be utilized as storage or loading space.

Another object of the present invention resides in a roof for motor vehicles provided with a roof frame which permits the attainment of a high rigidity and strength of the roof without the need for a considerable increase in weight.

Still another object of the present invention resides in a motor vehicle roof which permits great freedom in the design of the front or rear windowpane.

Another object of the present invention resides in a roof for motor vehicles, especially for passenger motor vehicles which permits an accommodation of the headlights and/or signalling lights at the roof without impairing the streamlining of the vehicle and without producing disturbing wind noises.

Still another object of the present invention resides in a roof of the aforementioned type which permits a safe accommodation of the signalling lights and/or the headlights in the roof without significant increases in the structural expenditures.

These and other objects, features, and advantages of the present invention will become more apparent from the following description when taken in connection with the accompanying drawing which shows, for purposes of illustration only, several embodiments in accordance with the present invention, and wherein:

FIG. 1 is a somewhat schematic side elevational view, partially broken away, of a motor vehicle with a roof in accordance with the present invention, the cross section being taken along line I—I of FIG. 2;

FIG. 2 is a somewhat schematic plan view on one-half of a motor vehicle corresponding to FIG. 1;

FIG. 3 is a plan view on one-half of a modified embodiment of a vehicle according to the present invention, similar to FIG. 2;

FIG. 4 is a partial cross-sectional view, on an enlarged scale, taken along line IV—IV of FIG. 3;

FIG. 5 is a partial cross-sectional view, taken along line V—V of FIG. 4;

FIG. 6 is a schematic side elevational view of a motor vehicle with a modified construction of a roof in accordance with the present invention;

FIGS. 7a and 7b are, respectively, front and rear elevational views of one-half of the vehicle according to FIG. 6, the vehicle being constructed symmetrically with respect to its vehicle center longitudinal plane;

FIG. 8a is a schematic plan view on one-half of a motor vehicle according to FIG. 6;

FIG. 8b is a schematic plan view on one-half of a modified embodiment of a vehicle, similar to FIG. 8a;

Figure 9:
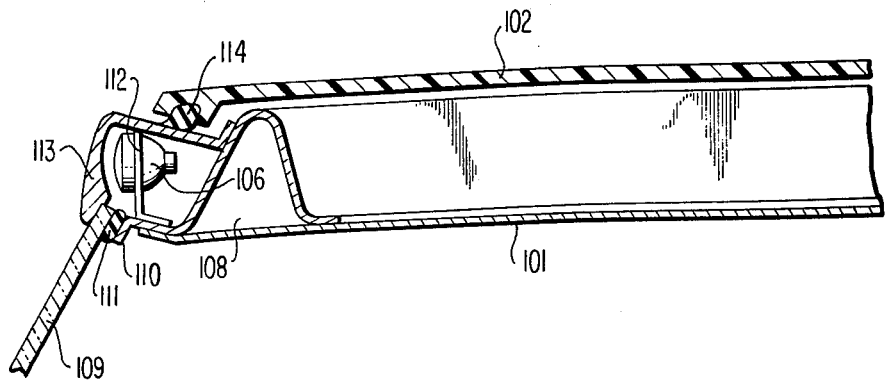
FIG. 9 is a partial longitudinal cross-sectional view, on an enlarged scale, through a roof according to the present invention within the area of the front windshield pane.

Referring now to the drawing wherein like reference numerals are used throughout the various views, and more particularly to FIG. 1, the passenger motor vehicle illustrated in this figure includes a passenger space which is delimited in the upward direction by a roof sheet metal panel or plate 1. A roof frame constituted by longitudinal bearers or girders 2 and cross bearers or girders 3 is disposed above the roof panel or plate 1; the roof frame is covered off against the outside by a cover plate 4.

The roof panel or plate 1 is constructed as a dish or shell open in the upward direction whose edge 5 is bent up in extension of the front windshield 6 and the rear window 7 as well as of the side walls. The roof panel or plate 1 rests on columns 8 and 9 which support the roof frame. The columns 8 and 9 additionally delimit the lateral door cutouts of the vehicle. The cover plate 4 is secured in a dust- and water-tight manner at the circumferential edge 5 of the roof panel or plate member 1 so that the space disposed between the roof panel or plate member 1 and the cover plate 4 can be utilized as additional storage or loading space.

The cross bearers 3 extend within the planes of the columns 8 of the two vehicle sides which delimit the front windshield pane 6 and the rear windowpane 7, respectively. The cross bearers 3 thus are at a distance with respect to the rear and forward edge of the roof panel or plate 1 which is thus completely free as regards its configuration in conjunction with the associated rear windowpane 7 or front windshield pane 6. Additionally, the cross bearers or girders 3 of the roof frame are thereby located approximately within the area in which are normally disposed the heads of the vehicle passengers.

A further cross bearer 10 may be provided in the center between the door columns 9 which complements the roof frame. This cross bearer 10 may, like the cross bearers 3 and the longitudinal bearers 2 consist of a profile, for example, of a hat-shaped profile or sectional member which is welded onto the roof sheet metal panel or plate 1 by means of flanges and forms hollow bearers.

In the embodiment according to FIGS. 3 to 5, a roof sheet metal panel or plate 11 is also provided which is constructed as a shell or dish open in the upward direction. A roof frame is disposed outside of the vehicle interior space delimited in the upward direction by this roof panel or plate 11; the roof frame is formed by longitudinal bearers or girders 12 and cross bearers or girders 13. A cover plate 14 forms the upper closure which is made of synthetic plastic material. In this embodiment, the longitudinal bearers or girders 12 and cross bearers or girders 13 constructed as hollow bearers extend about the contour of the roof panel or plate 11 whereby the cross bearers 13 form the upper boundary of the windshield pane 6 and of the rear windowpane 7. The bent-up edge 15 of the shell-shaped sheet metal panel or plate 1 thereby forms a wall of the hollow bearers which are constituted by a circumferential profile and this edge, whereby the profile is connected with the roof panel or plate 11, for example, by spotwelding. A further cross bearer 10 is provided in the center, which is arranged within the plane of the two center door columns 9 transversely between the two longitudinal bearers 12. This cross bearer 10 is constituted by a hat-shaped profile or sectional member mounted on the roof panel or plate 11 and welded thereto. This hat-shaped profile is provided at its two ends with angularly bent tabs or lugs which are welded to the bent-up edge 15 of the roof panel 11 constructed as shell (FIG. 4).

In this embodiment, the roof panel or plate 14 rests on the circumferential roof frame by means of a downwardly, angularly bent-off edge 16. A sealing profile 17 is arranged between this edge 16 and the roof frame which enables a dust-tight and water-tight closure of the space created by the roof panel 11. The cover plate 14 which may consist of a dyed-in or transparent plastic material of any conventional type may be threadably connected at the roof frame or at the roof panel 11. Additionally, it is also possible to mount the cover plate 14 as well as the cover plate 4 of the embodiment according to FIGS. 1 and 2 either pivotally or tiltably or displaceably at the roof panel 11 or at the roof frame.

The vehicle illustrated in FIGS. 6 through 8 is provided with a roof that consists essentially of two roof plates or panels 101 and 102 that enclose a hollow space, in which are again arranged cross and longitudinal girders or bearers which may be constructed as disclosed hereinabove or in any other suitable manner and therefore are not illustrated in detail, and which form a roof frame. The lower roof plate 101 has again the shape of the shell whose edges 103 are bent up in the upward direction in such a manner that they continue in the direction of the covering parts disposed therebelow. The edges of the outer roof plate 102, which preferably consists of synthetic plastic material of any known type, are bent-off downwardly in a similar manner in extension of the contours of the adjoining covering parts and of the edge 103 of the lower roof plate 101. The two roof plates 101 and 102 are connected with each other in a dust-tight and water-tight manner not illustrated in detail by conventional means. The upper roof plate 102 which may be of unitary, integral construction or of multipartite construction, is thereby preferably detachably secured so that the space enclosed between the two roof plates 101 and 102 can be opened by a pivoting, lifting or displacing or the like of the upper roof plate 102.

The cross and longitudinal bearers or girders of the roof frame, which are not visible in FIGS. 6 through 8b and which are disposed between the roof plates 101 and 102 are so arranged that the longitudinal girders or bearers extend approximately within the area of the side edges of the roof whereas the cross girders or bearers are set back with respect to the outer cross edges of the roof and with respect to the adjacent front and rear windowpanes. The longitudinal girders extending in the longitudinal direction may thereby form hollow bearers together with the bent-up edge 103 of the roof plate 101. These hollow bearers may be utilized for the mounting of positioning lights 104 and heating or ventilating slots 105. The forwardly pointing headlights 106 and the rearwardly pointing tail lights 107 which may consist of brake lights, tail lights, rear headlights and blinker ights are disposed essentially within the contour of the roof which is determined above all by the edge 103 of the lower roof plate 101.

The cross section illustrated in FIG. 9 through the forward area of a roof illustrates how a forward cross bearer or girder 108 is arranged on the inside of the two roof plates 101 and 102. The forward cross girder 108 is constituted by an essentially triangularly shaped profile member which rests with its open side on the lower roof plate 101 and is secured thereat, for example, again by spot welding. The cross girder 108 constructed as hollow bearer is disposed offset with respect to the windshield pane 109 at a horizontal distance toward the vehicle center, while the windshield pane 109 abuts at a forwardly projecting abutment flange 110 if the cross girder 108. An elastic strip 111 is provided between the abutment flange 110 and the windshield pane 109. A headlight 106 is accommodated within the space between the cross girder 108 and the windshield pane 109, which is held by a support 112 that is secured on the cross girder 108. A cover pane 113 is provided for the headlight 106 which has an essentially triangularly shaped cross section. The downwardly directed leg which extends approximately in the plane of the not visible edge 103 of the lower roof plate 101, is supported at the windshield pane 109 whereas the rearwardly directed other leg is secured at the cross girder 108. The cover pane 113 is covered off at least partially by the outer roof plate 102 which rests by means of a sealing bar 114 from above on the cover pane 113. The cover pane 113 extends in this embodiment transversely over the full width of the windshield pane 109 and replaces within this area the edge 103 of the roof plate 101. In this embodiment, provision is made, for example, that the upper roof plate 102 which is made of synthetic plastic material can be removed by tilting, pivoting, sliding or the like.

Figure 11:
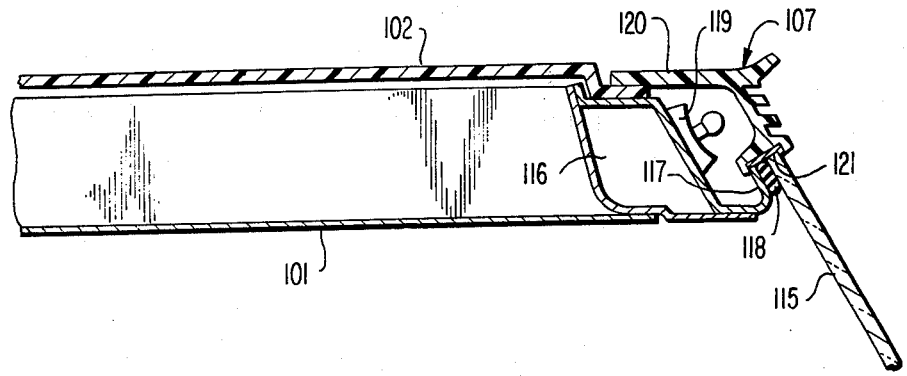
FIG. 11 is a partial cross-sectional view in the longitudinal direction of a roof according to the present invention within the area of a rear windowpane.

In FIG. 11 there is illustrated the area of a roof consisting of a lower roof plate 101 and of an upper roof plate 102 which adjoins the rear windowpane 115 of a vehicle. Also, in this embodiment a cross girder or bearer 116 enclosed by the roof plates 101 and 102 is set back in the horizontal direction with respect to the upper edge of the rear windowpane 115. Two sheet metal profiles connected with each other by spot welding form the hollow bearer serving as cross girder 116, of which one is provided with an abutment flange 117 for the upper edge of the rear windowpane 115. Also, in this embodiment an elastic profile 118 is provided between the abutment flange 117 and the rear windowpane 115. In this embodiment, the cross grider 116 is provided with bores for lamp housings 119 and tail lights generally designated by reference numeral 107 so that it can be considered directly as mounting support for the tail lights 107.

The upper roof plate 102 terminates within the area of the upper forward edge of the cross girder 116. A cover pane 120 which is provided between this upper forward edge and the rear windowpane 115, has an essentially angularly shaped cross section. One leg of this cover pane 120 is threadably mounted on the cross girder 116 or on the upper roof plate 102. The other leg portion is supported by way of an intermediate profile 121 at the upper edge of the rear windowpane 115. The light discharge area which is disposed in extension of the rear windowpane 115 is thereby constructed in a particular manner in order to obtain an air flow preventing as much as possible a soiling thereof.

A partial cross section disposed transversely to the driving direction of a roof of the present invention is illustrated in FIG. 10a which again consists of an inner roof plate 101 and of an outer roof plate 102 which receive therebetween roof girders or bearers, of which a longitudinal girder 122 can be seen in FIG. 10a. This longitudinal girder 122 is a hollow bearer which is constituted by an angle profile welded together with the bent-up edge 103 of the roof plate 101. The longitudinal girder 122 is provided on the outside thereof with an elastic sealing bar 123 which is mounted on outwardly projecting securing flanges. The sealing bar 123 is surrounded by the downwardly angularly bent edge 124 of the upper roof plate 102. As is further shown in FIG. 10a, the bent-up edge 103 of the lower roof plate 101 has a profile configuration 125 for the accommodation of a side windowpane 126.

Figures 10A, 10B:
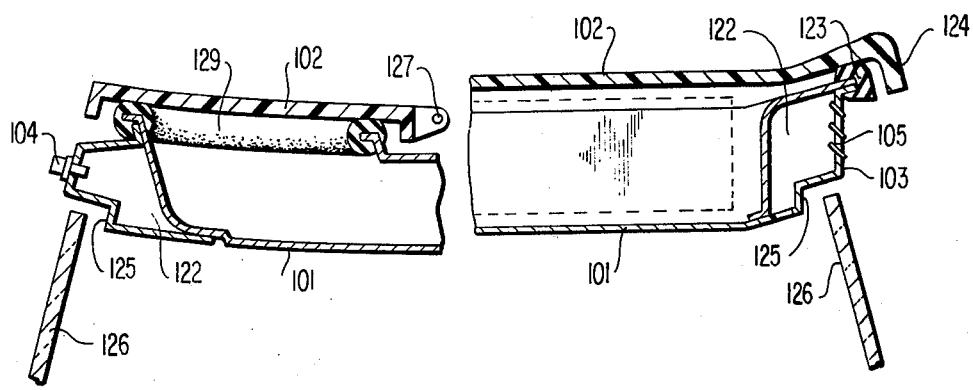
FIGS. 10a and 10b are partial transverse cross-sectional views through two different embodiments of roofs in accordance with the present invention, the roofs being symmetrical with respect to the center longitudinal plane.

FIG. 10b illustrates a modified embodiment of the construction according to FIG. 10a, in which the bent-up edge 103 of the lower roof plate 101 is constituted into a hollow bearer by an outwardly disposed profile or sectional member, which serves as longitudinal girder 122. In this embodiment, the profiled portion of the longitudinal girder 122 is provided with a profile configuration 125 for a side windowpane 126. Additionally, it is equipped with a positioning light 104 or the like which projects outwardly beyond the vehicle contour.

The upper roof plate 102 is constructed multi-partite in the embodiment of FIG. 10b. It is pivotally arranged, for example, about a longitudinal axis 127 extending in the vehicle center so that respectively one-half can be tilted up into the vehicle longitudinal center plane. The pivot means constituting the longitudinal axis 127 are supported in a manner not illustrated in detail by a longitudinal profile or section member 128. The opening disposed between the longitudinal profile 128 and the edge 103 of the lower roof plate 101 is enclosed with an elastic sealing profile 129, on which rests the upper roof plate 102 from above.

All embodiments of FIGS. 6–11 illustrate a construction according to which the upper and lower roof plates extend essentially parallel to one another. However, it is possible to deviate from this configuration if, for example, for achieving spaces of predetermined configuration, another form or shape of the other upper roof plate appears appropriate. In contrast thereto, the lower roof plate 102 will be so constructed and shaped in most cases that the vehicle space is delimited by an at least approximately horizontal and smooth inner surface which has no projecting edges, against which may impinge or hit the vehicle passengers in case of an accident.

The set-back arrangement of the cross girders leads to an increased form rigidity of the roof if the cross girders extend in the same plane as the respective forward and rear roof columns as shown, for example, in FIG. 1, i.e., connect these roof columns along the shortest possible path.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A roof for a motor vehicle comprising a roof structure means including a roof plate means for defining the upper extent of a vehicle interior space and a roof frame means including longitudinal girder means and cross girder means, said longitudinal and cross girder means being formed into said structure with said roof plate means with said longitudinal and cross girder means being on the exterior side of said roof plate means from said vehicle interior space, and separate cover plate means for separately covering the exterior of said structure of longitudinal and cross girder means, said separate cover plate means being movably secured to at least one of the roof plate means and the girder means.

2. A roof for a motor vehicle according to claim 1, characterized in that the vehicle is a passenger motor vehicle and in that the roof plate means substantially delimits the passenger space in the upward direction.

3. A roof according to claim 1, characterized in that profile members serve as longitudinal and cross girder means which together with the roof plate means form hollow bearers.

4. A roof according to claim 3, characterized in that the roof plate means is constructed as a shell open in the upward direction, whose bent-up edge serves as walls of the outwardly disposed longitudinal and cross girder means constructed as hollow bearers.

5. A roof according to claim 4, characterized in that the cross girder means are disposed at a distance to the forward or rearward edge of the roof plate means in a plane substantially coinciding with column means of a support frame structure of the vehicle which supports the roof frame means.

6. A roof according to claim 5, characterized in that the space enclosed by the roof plate means, the longitudinal and cross girder means, and the cover plate means is sealed off against the outside.

7. A roof according to claim 6, characterized in that the cover plate means is detachably secured at the roof plate means.

8. A roof according to claim 6, characterized in that the cover plate means is movably secured at the roof plate means.

9. A roof according to claim 6, characterized in that the cover plate means is detachably secured at the girder means.

10. A roof according to claim 6, characterized in that the cover plate means is movably secured at the girder means.

11. A roof according to claim 6, characterized in that the cover plate means essentially consists of synthetic plastic material.

12. A roof according to claim 4, characterized in that the cross girder means extend at a horizontal distance with respect to upper edges of respective front or rear windowpanes and leave open a space for the accommodation of light means.

13. A roof according to claim 12, characterized in that the roof is for a passenger motor vehicle.

14. A roof according to claim 12, characterized in that the light means includes signalling lights.

15. A roof according to claim 12, characterized in that the light means includes headlights.

16. A roof according to claim 12, characterized in that said light means includes signalling lights and headlights.

17. A roof according to claim 12, characterized in that the cross girder means form on the outside thereof mounting means for the light means, and cover pane means for covering the light means against the outside.

18. A roof according to claim 17, characterized in that the cross girder means receive on the outside thereof the cover pane means for the light means.

19. A roof according to claim 17, characterized in that the cross girder means form on the outer side thereof the cover pane means for the light means.

20. A roof according to claim 17, characterized in that the cover pane means cover the space between the upper edges of the respective front or rear windowpane and said separate cover plate means.

21. A roof according to claim 20, characterized in that the cover pane means extend substantially over the full roof width.

22. A roof according to claim 21, characterized in that said cross girder means extending at a horizontal distance with respect to said upper edges of respective front and rear windowpanes are provided with abutment flanges for the upper edges of the respective front and rear windowpane, the abutment flanges being directed toward a respective vehicle end.

23. A roof according to claim 22, characterized in that the space occupied by the light means is covered off at least partially by the cover plate means.

24. A roof according to claim 23, characterized in that the cover plate means is removably mounted.

25. A roof according to claim 24, characterized in that the light means include signalling lights constructed as structural units.

26. A roof according to claim 25, characterized in that the light means includes headlights.

27. A roof according to claim 24, characterized in that the cover plate means consists of synthetic plastic material.

28. A roof according to claim 27, characterized in that at least one sealing means is provided between the cover plate means and the parts of the roof disposed therebelow.

29. A roof according to claim 28, characterized in that several such sealing means are provided.

30. A roof according to claim 1, characterized in that the roof plate means is constructed as a shell open in the upward direction, whose bent-up edge serves as walls of the outwardly disposed longitudinal and cross girder means constructed as hollow bearers.

31. A roof for a motor vehicle comprising a roof structure means including a roof plate means for defining the upper extent of a vehicle interior space and a roof frame means including longitudinal girder means and cross girder means, said longitudinal and cross girder means being formed into said structure with said roof plate means with said longitudinal and cross girder means being on the exterior side of said roof plate means from said vehicle interior space, and separate cover plate means for separately covering the exterior of said structure of longitudinal and cross girder means, characterized in that the cross girder means are disposed at a distance to the forward or rearward edge of the roof plate means in a plane substantially coinciding with column means of a support frame structure of the vehicle which supports the roof frame means.

32. A roof according to claim 1, characterized in that the space enclosed by the roof plate means, the longitudinal and cross girder means, and the cover plate means is sealed off against the outside.

33. A roof according to claim 1, characterized in that the cover plate means is detachably secured at the roof plate means.

34. A roof according to claim 1, characterized in that the cover plate means is movably secured at the roof plate means.

35. A roof according to claim 1, characterized in that the cover plate means is detachably secured at the girder means.

36. A roof according to claim 1, characterized in that the cover plate means is movably secured at the girder means.

37. A roof according to claim 1, characterized in that the cover plate means essentially consists of synthetic plastic material.

38. A roof according to claim 1, characterized in that the cross girder means extend at a horizontal distance with respect to upper edges of respective front or rear windowpanes and leave open a space for the accommodation of light means.

39. A roof for vehicles, which accommodates light means, comprising a double-walled roof including two roof plate means, said two roof plate means including an upper roof plate means and a lower roof plate means, and longitudinal girder means and cross girder means, said longitudinal and cross girder means being contained between said two roof plate means with said cross girder means being disposed at a horizontal distance with respect to upper edges of a respective front or rear windowpane for providing a space for the accommodation of light means, characterized in that the cross girder means form on the outside thereof mounting means for the light means, and cover pane means for covering the light means against the outside.

40. A roof according to claim 39, characterized in that the cover pane means cover the space between the upper edges of the respective front or rear windowpane and the outer roof plate means.

41. A roof according to claim 40, characterized in that the cover pane means extend substantially over the full roof width.

42. A roof according to claim 39, characterized in that said cross girder means disposed at a horizontal distance with respect to said upper edges of respective windowpanes are provided with abutment flanges for the upper edges of the respective front and rear windowpane, the abutment flanges being directed toward a respective vehicle end.

43. A roof according to claim 1, characterized in that the roof plate means is constructed as a shell open in the upward direction, whose bent-up edge serves as extensions of a front and rear windowpane, as well as side walls of the roof structure.

44. A roof according to claim 1, characterized in that the cross girder means includes a cross bearer provided in the center between door column means of a support frame structure of the vehicle which supports the roof frame means.

45. A roof according to claim 1, characterized in that the cover plate means is pivotally secured at the roof plate means.

46. A roof according to claim 1, characterized in that the cover plate means is pivotally secured at the girder means.

47. A roof according to claim 31, characterized in that the space enclosed by the roof plate means, the longitudinal and cross girder means, and the cover plate means is sealed off against the outside.

48. A roof according to claim 31, characterized in that the cover plate means is detachably secured at the roof plate means.

49. A roof according to claim 31, characterized in that the cover plate means is movably secured at the roof plate means.

50. A roof according to claim 31, characterized in that the cover plate means is detachably secured at the girder means.

51. A roof according to claim 31, characterized in that the cover plate means is movably secured at the girder means.

52. A roof according to claim 31, characterized in that the cover plate means essentially consists of synthetic plastic material.

53. A roof according to claim 31, characterized in that the cross girder means extend at a horizontal distance with respect to upper edges of respective front and rear windowpanes for providing a space for accommodation of light means.

54. A roof according to claim 53, characterized in that the light means includes signaling lights.

55. A roof according to claim 53, characterized in that the light means include headlights.

56. A roof according to claim 53, characterized in that said light means includes signaling lights and headlights.

57. A roof according to claim 53, characterized in that the cross girder means form on the outside thereof mounting means for the light means, and cover pane means for covering the light means against the outside.

58. A roof according to claim 57, characterized in that the cover pane means cover the space between the upper edges of the respective front and rear windowpanes and the cover plate means.

59. A roof according to claim 58, characterized in that the cover pane means extends substantially over the full roof width.

60. A roof according to claim 39, characterized in that the light means includes signaling lights.

61. A roof according to claim 39, characterized in that the light means includes headlights.

62. A roof according to claim 39, characterized in that the light means includes signaling lights and headlights.

63. A roof according to claim 39, characterized in that the space occupied by the light means is covered off at least partially by the upper roof plate means.

64. A roof according to claim 63, characterized in that the upper roof plate means is removably mounted.

65. A roof according to claim 39, characterized in that the upper roof plate means consists of synthetic plastic material.

66. A roof according to claim 39, characterized in that at least one ceiling means is provided between the upper roof plate means and portions of the roof disposed therebelow.

* * * * *